United States Patent Office 3,206,495
Patented Sept. 14, 1965

3,206,495
DIMETHYL 1,3-DICHLORO-2-PROPYL PHOSPHATE
Earl T. McBee, Lafayette, and John G. Damrath, West Lafayette, Ind., assignors to Purdue Research Foundation, West Lafayette, Ind., a corporation of Indiana
No Drawing. Filed Jan. 9, 1963, Ser. No. 250,232
1 Claim. (Cl. 260—461)

This invention relates to a composition of matter classified in the art of chemistry as a trialkyl phosphate and to a process for making such a composition.

The invention sought to be patented, in its composition aspect, resides in the concept of a chemical compound having the structure dimethyl 1,3-dichloro-2-propyl phosphate.

The invention sought to be patented, in its process aspect, resides in the concept of embodying such a molecular structure in tangible form by reacting dimethyl chlorophosphate with epichlorohydrin in the presence of a Lewis acid.

The tangible embodiment of this invention, dimethyl 1,3-dichloro-2-propyl phosphate is a colorless, high-boiling oil useful as a plasticizer and as an insecticide.

The manner and process of making and using this invention is illustrated by the following general description and examples, which set forth the best mode contemplated by us of carrying out the invention so as to enable any person skilled in the art of chemistry to make and use the same.

The compound of the present invention is most conveniently prepared by the reaction of dimethyl chlorophosphate and epichlorohydrin in the presence of a catalyst. Preferably, the epichlorohydrin is added slowly to a stirred suspension of the catalyst in dimethyl chlorophosphate. The catalyst is of the class generally recognized as Friedel-Crafts catalysts such as aluminum chloride, ferric chloride, stannic chloride and others which are collectively known as Lewis acids. Heating of the reaction mixture while the epichlorohydrin is being added and after the addition is complete to insure completeness of the reaction increases the yield of product obtained. After the reaction is complete, unreacted epichlorohydrin is recovered and the product purified by vacuum distillation.

In an alternate synthetic approach, 1,3-dichloro-2-propanol is reacted with dimethyl chlorophosphate. In order to get an appreciable yield of product, the reaction should be carried at ice bath temperatures or below in the presence of an unreactive solvent and a tertiary amine acid acceptor such as pyridine. Preferably, dimethyl chlorophosphate in an inert solvent is added to 1,3-dichloro-2-propanol and the acid acceptor also dissolved in an unreactive solvent. When the reaction is complete, the solid hydrochloride, i.e. pyridine hydrochloride if pyridine is the acid acceptor, is quickly separated in the cold. The product may be purified by elution from an alumina column and by vacuum distillation.

Our invention is further illustrated by the following examples (all of the temperatures are given in degrees centigrade):

*Example 1*

A round bottomed, three-necked flask, fitted with a mercury sealed stirrer, addition funnel and reflux condenser, was charged with 7.35 grams (0.051 mole) of dimethyl chlorophosphate and 1.0 gram of titanium tetrachloride. The contents of the reaction flask were stirred and kept at 60 degrees while 6.0 grams (0.064 mole) of epichlorohydrin was carefully added over the period of one hour. The reaction mixture was stirred at 60 degrees for an additional hour. The excess epoxide was removed by vacuum distillation and the reaction mixture distilled. There was obtained 8.75 grams of dimethyl 1,3-dichloro-2-isopropyl phosphate boiling 123.5–125 degrees at about 2 millimeters of mercury pressure.

*Analysis.*—Calculated for $C_5H_{11}Cl_2O_4P$: C, 25.33; H, 4.64; Cl, 29.91. Found: C, 25.54; H, 4.84; Cl, 29.81.

By means of vapor chromatography, the product obtained was found to be identical with that obtained by the more conventional approach of the next example.

*Example 2*

A round bottomed flask was charged with 55 milliliters of carbon tetrachloride, 25 milliliters of dry ethyl ether, 10.06 grams (0.079 mole) of 1,3-dichloro-2-propanol and 6.06 grams (0.079 mole) of pyridine. The stirred reaction mixture was cooled. When a temperature of −15 degrees had been attained, 11.34 grams (0.079 mole) of dimethyl chlorophosphate was added dropwise over a period of two hours. The solid pyridine hydrochloride was quickly collected on a filter and the solvent removed on an evaporator as rapidly as possible without heating above 20 degrees. The residue was placed on an acid washed alumina packed column with ether and eluted with ether. On distillation, there was obtained 3.42 grams of dimethyl 1,3-dichloro-2-propyl phosphate boiling 130 degrees at a pressure of about 4 millimeters of mercury.

The use of trialkyl phosphates as plasticizers is well known to those skilled in the art. Dimethyl 1,3-dichloro-2-propyl phosphate, when used as a plasticizer, is mixed or blended with the monomer reaction mixture or the polymer to be plasticized in the customary manner. The use of our compound as an insecticide is illustrated by the following descriptive example:

An aqueous dispersion of dimethyl 1,3-dichloro-2-propyl phosphate was tested against Mexican bean beetles. The percent mortality obtained for the various concentrations of active ingredient employed was as follows:

| Phosphate concentration, percent | Beetle mortality, percent |
|---|---|
| 0.025 | 13 |
| 0.05 | 50 |
| 0.1 | 88 |

While the compound of the present invention is dimethyl 1,3-dichloro-2-propyl phosphate, it is apparent that compounds in which the methyl groups are replaced by other lower alkyl groups, particularly those having up to four carbon atoms, will exhibit the same properties as and will be fully equivalent to the dimethyl compound.

We claim:
Dimethyl 1,3-dichloro-2-propyl phosphate.

References Cited by the Examiner

UNITED STATES PATENTS

| | | | |
|---|---|---|---|
| 1,936,985 | 11/33 | Lommel et al. | 260—461 |
| 2,157,164 | 5/39 | Daly et al. | 260—461 |
| 2,610,978 | 9/52 | Lanham | 260—461 |
| 2,947,773 | 8/60 | Allen et al. | 260—461 |
| 3,010,988 | 11/61 | Raffelson et al. | 260—461 |
| 3,027,296 | 3/62 | Whetstone | 260—461 |

FOREIGN PATENTS 784,986  10/57  Great Britain.

OTHER REFERENCES

Pudovik et al.: "Zhur. Obshchei Kim.," vol. 32, pp. 231–237 (January 1962).

CHARLES B. PARKER, *Primary Examiner.*

NICHOLAS S. RIZZO, *Examiner.*